Aug. 27, 1946.   A. M. STONER   2,406,444
CHUCK RELEASE MECHANISM
Filed March 14, 1945   2 Sheets-Sheet 1
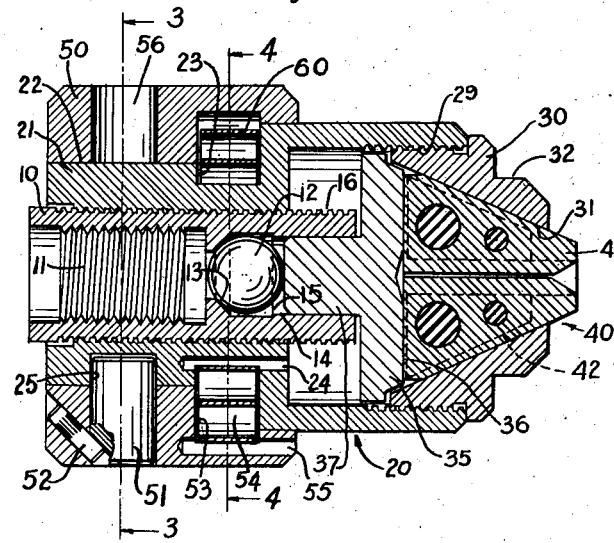
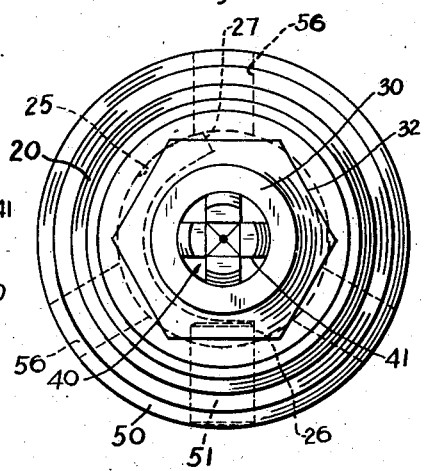
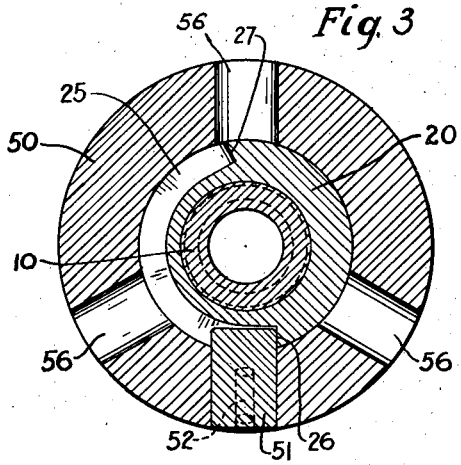
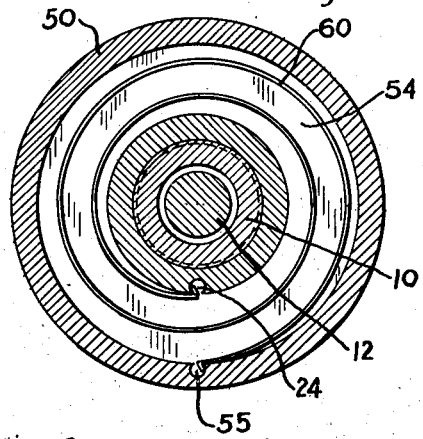
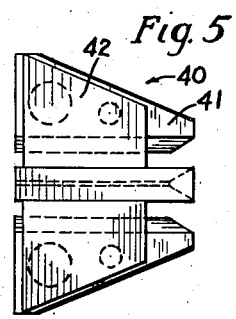
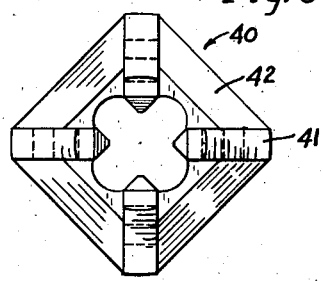
INVENTOR.
ARTHUR MERRICK STONER
BY
E. W. Marshall
ATTORNEY Aug. 27, 1946.  A. M. STONER  2,406,444
CHUCK RELEASE MECHANISM
Filed March 14, 1945  2 Sheets-Sheet 2

INVENTOR.
ARTHUR MERRICK STONER
BY
E. W. Marshall
ATTORNEY

Patented Aug. 27, 1946

2,406,444

UNITED STATES PATENT OFFICE 2,406,444

CHUCK RELEASE MECHANISM

Arthur Merrick Stoner, West Hartford, Conn., assignor to The Jacobs Manufacturing Company, Hartford, Conn., a corporation of Connecticut Application March 14, 1945, Serial No. 582,737

7 Claims. (Cl. 279—48)

This invention relates to a chuck release mechanism and its object is to provide a simple and effective device for disengaging parts of a chuck which have become wedged against a tool, to facilitate removal of the tool. It is particularly adaptable for self-tightening chucks of the keyless type. Another object is to provide a chuck from which a tool may be removed and another inserted while the chuck is rotating.

In the use of chucks which are arranged to cause the torque on the tool, such as a drill, to tighten the gripping effect on the tool, the tool often becomes locked into the chuck so tightly that it is difficult to disengage it. According to the present invention I provide a simple mechanism in which a spring-actuated hammer blow may be delivered on the parts which cause the locking to be effected.

In the accompanying drawings I have shown chucks which illustrate this invention.

In these drawings:

Figure 1 is a sectional side elevation of a chuck which embodies the invention;

Fig. 2 is a front elevation of the chuck shown in Fig. 1;

Figs. 3 and 4 are sectional end elevations of the device shown in the preceding figures, the sections being taken respectively on the lines 3—3 and 4—4 of Fig. 1;

Fig. 5 is a side elevation and Fig. 6 a front view of the collet shown in Figs. 1 and 2. In Figs. 1 and 2 the collet is closed and in Figs. 5 and 6 it is open.

Figure 7:
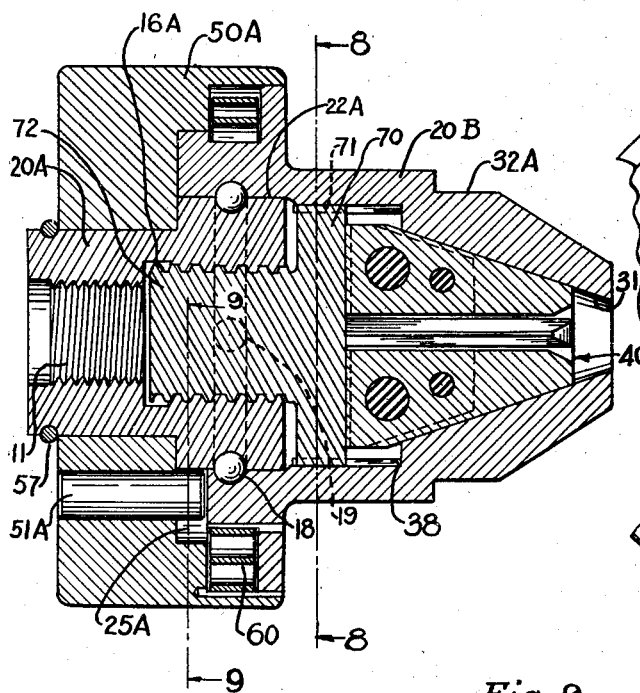
Figure 8:
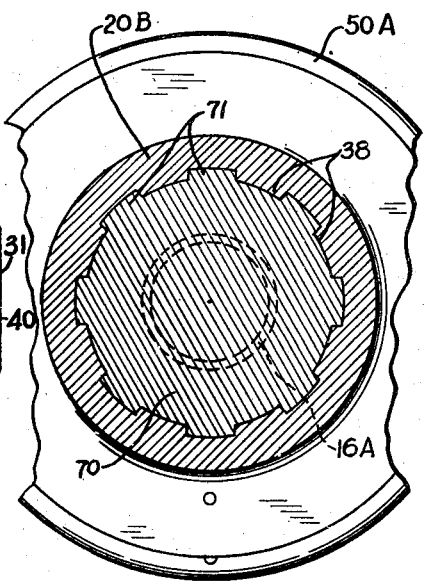
Figure 9:
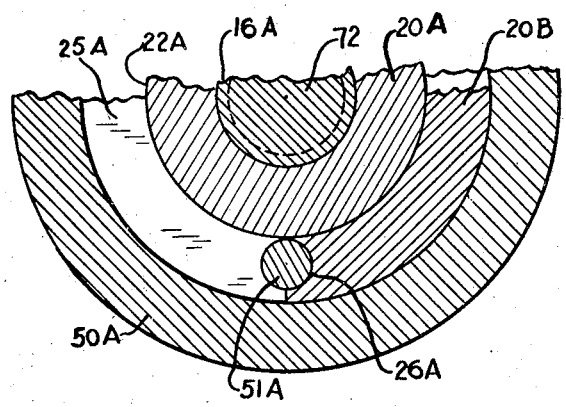

Fig. 7 is a sectional side elevation of a chuck of a modified construction which also embodies this invention;

Figs. 8 and 9 are sectional end elevations of parts shown in Fig. 7, the sections being taken respectively on the line 8—8 and the irregular line 9—9 of Fig. 7.

10 designates a hollow sleeve which is arranged to be attached to the spindle of a machine tool. In the particular example illustrated the rear portion of the sleeve is internally threaded, as at 11, for this purpose. 12 is a hardened steel ball seated on an inclined annular shoulder 13 formed in the sleeve. The bore 14 in the forward part of the sleeve is of a slightly smaller diameter than that of the ball. The ball is forced through this bore into cylindrical opening in the sleeve which forms with the bore a shoulder 15 which retains the ball in the sleeve. The sleeve is externally threaded through the greater part of its length, as shown at 16.

The body of the chuck is designated generally by the reference numeral 20. The rear portion 21 of the body is a hollow cylinder which is internally threaded to fit the threads 16 on the sleeve 10. This part of the body has a smooth cylindrical surface 22 in which is a continuous annular flat sided groove 23. 24 is a longitudinal hole drilled in the body and intersecting the inner surface of the groove 23. Spaced from the groove 23 is a non-continuous flat sided groove 25 the ends of which are designated by 26 and 27. The forward part of the body is a hollow cylinder of larger diameter than that of the part 21. The forward part of its inner surface is threaded, as at 29.

30 is an externally threaded pressure member which fits the threads 29. It has an internal conical cam surface 31 and an external polygonal part 32 for wrench engagement.

Back of the pressure member 30 is an abutment disk 35. This has a flat transverse front surface 36 and a cylindrical boss 37 projects from its rear side. This boss is mounted to rotate freely in the bore 14 of sleeve 10 and its rear end abuts the ball 12.

A collet 40 is interposed between the pressure member 30 and the disk 35. This comprises a plurality of angularly spaced perforated gripping members 41 interconnected by a body 42 of resilient material such as oil resistant synthetic rubber. The rear ends of the gripping members are normal to the axis of the chuck and are arranged to be seated on the surface 36 of disk 35. The outer edges of the gripping members are tapered at the same angularity as that of the cam surface 31 and are arranged to be engaged by the latter.

Rotatively mounted on the cylindrical surface 22 of the body is a shock sleeve 50. A radially disposed plug 51 extends through the shock sleeve into the groove 25 in body 20. This plug is held in place and against rotation in the sleeve 50 by a diagonally disposed pin 52.

An annular groove 53 spaced from the plug 51 is formed in the inside of the sleeve 50, the sides of which register with the sides of the groove 23 in the body and form a pocket 54. 55 is a longitudinal hole drilled in the sleeve 50 and intersecting the inner surface of the groove 53. 56 are radially disposed holes drilled into the sleeve 50 for the reception of a spanner wrench.

60 is a flat spring in the pocket 54. The ends of this spring are bent outwardly and enter the holes 24 and 55 in the body 20 and the sleeve 50 and tend to rotate the sleeve on the body in the direction of the arrow in Fig. 4 to move the plug 51 against the end 26 of the groove 25, as shown in Fig. 3. The pressure member 30 may be securely attached to the body 20 by wrenches affixed to the shock sleeve and the pressure member.

The operation of this device is as follows: The collet may be loosened or opened by turning the body 20 on the sleeve 10 in a counter-clockwise direction, as viewed from the front of the chuck. This moves the pressure member 30 and the abutment disk 35 apart and allows the collet to expand and its gripping members 41 to move outwardly toward the positions in which they are shown in Figs. 5 and 6. Then after a tool such as a drill is inserted in the collet, the body is turned on the sleeve in the opposite direction to bring the gripping members 41 into engagement with the tool. During this operation the abutment disk 35 and the collet rotate with the body because of the non-frictional bearing of the boss 37 and the engagement of the gripping members 41 with the surface 36 of the disk and with the cam surface 31 of the pressure member so that the collet is not distorted.

When the sleeve 10 is driven in a counter-clockwise direction and its rotation is imparted to the tool, opposition to this rotation of the tool, due to the work imposed upon it, causes further relative rotation of the body 20 on the sleeve 10 in a clockwise direction and increases the pressure of the gripping members on the tool. This pressure often becomes so great that it is difficult to disengage the tool by turning the body 20 on the sleeve in a counter-clockwise direction. To overcome this difficulty, I have provided the device herein disclosed which operates in the following manner:

The tool is backed off from its engagement with the work and the shock sleeve 50 given a relative rotation on the body in a clockwise direction against the action of the spring 60. This will cause the plug 51 to move away from the end 26 of the groove 25. The relative movement thus attained will be limited by the plug reaching the end 27 of the groove.

Now when the shock sleeve is released suddenly the spring 60 rotates it on the body in the opposite direction and causes the plug 51 to deliver a hammer blow on the end 26 of groove 25 which will drive the body 20 rotatively in a counter-clockwise direction on the sleeve 10. This operation is performed conveniently while the chuck is rotating by retarding the rotation of the shock sleeve and then releasing it and may be repeated if necessary. The engagement of the collet on the tool will become loosened thereby, in fact the tool will drop out of the chuck and another tool may be inserted without stopping the rotation of the chuck. Initial engagement of such other tool may then be effected by grasping the outer surface of the shock sleeve. The retarding effect need not be sufficient to separate the end 26 of the slot 25 from the plug 51 but if they are separated the shock sleeve is released gradually so that these surfaces will come together without a sudden impact.

Another form of self-tightening chuck is illustrated in Figs. 7, 8 and 9. The body is made in two parts 20A and 20B which are relatively rotatable on interfitting cylindrical surfaces at 22A. Balls 18 are interposed between the parts 20A and 20B. These are inserted in a suitable ball race through an opening 19 in the body 20B in the usual manner. The rear portion of the part 20A of the body is internally threaded as at 11 for engagement with the spindle of a machine tool, and its forward portion is internally threaded, as at 16A.

The conical cam surface 31 is formed in the front portion 20B of the body, the outside of which is formed with flat surfaces 32A for wrench reception. Between the inner conical surface 31 and the cylindrical surfaces 22A splines 38 are formed in the body part 20B.

70 is a disk-like portion of a collet actuator on the periphery of which splines 71 are formed which fit between the splines 38. 72 is a spindle which extends rearwardly from the disk 70. The outside of this spindle is threaded to fit the threads 16A. The rear end of the collet abuts the actuator 70.

A shock sleeve 50A is rotatively mounted on the body part 20A and is retained thereon by a split ring 57. 51A is a longitudinally disposed plug in the shock sleeve which extends into a groove 25A in the periphery of the rear end of body part 20B. One end of this groove is shown in Fig. 9 and is designated by 26A. The spring 60 which interconnects the shock sleeve and the body part 20B tends to hold the pin 51A against the end 26A of the groove 25A.

When relative rotation is imparted to the parts 20A and 20B of the body, the collet actuator 70 will rotate with the part 20B because of its splined connection therewith, and because of its threaded connection with the part 20A it will move longitudinally therein. Thus the longitudinal distance between the actuator 70 and the cam surface 31 may be adjusted.

This chuck is also self-tightening and can be released by its shock sleeve in the manner heretofore explained.

Various modifications in construction, mode of operation, use and method of an invention may and often do occur to others, especially after benefitting from knowledge of such a disclosure as that herein presented of the principles involved, but the invention itself is not confined to the present showing.

I claim:

1. In the type of chuck which is arranged to be rotated in one direction to drive a tool, a gripping member and means for moving the gripping member into engagement with a tool, and in which resistance to the rotation of the tool, actuates said means to tighten the engagement of the gripping member, a release mechanism comprising a rotatable shock sleeve, a spring biased to rotate the sleeve in the driving direction of the chuck, means for limiting the rotation of the sleeve in one direction so arranged that the sleeve may be rotated against the action of the spring and that the spring may return the sleeve and impart a hammer blow between said interengaging means.

2. In the type of chuck which is arranged to be rotated in one direction to drive a tool, a gripping member and means for moving the gripping member into engagement with a tool, and in which resistance to the rotation of the tool actuates said means to tighten the engagement of the gripping member, a shock sleeve rotatably supported by the chuck, a spring biased to rotate the sleeve in the driving direction of the body, interengaging parts of the chuck and of the sleeve to limit the rotation of the sleeve in one direction, said parts being so arranged that the sleeve may be rotated against the action of the spring and that the spring may return the sleeve and impart a hammer blow between said interengaging parts.

3. In the type of chuck which is arranged to be rotated in one direction to drive a tool, a gripping member and threaded means for moving the gripping member into engagement with a tool, and in which resistance to the rotation of the tool actuates said means to tighten the engagement of the gripping member, a shock sleeve rotatively supported by the chuck, a spring biased to rotate the sleeve on the chuck in the driving direction of the chuck, interengaging means for limiting the rotation of the sleeve comprising a non-continuous annular groove having a transverse end and a projection movable in said groove, said parts being so arranged that the sleeve may be rotated against the action of the spring and that the spring may return the sleeve and impart a hammer blow between said projection and the end of the groove.

4. In the type of chuck which is arranged to be rotated in one direction to drive a tool, a gripping member and threaded adjustable means for moving the gripping member into engagement with a tool in which resistance to the rotation of the tool actuates said means to tighten the engagement of the gripping member, a release mechanism comprising a shock sleeve, a spring biased to rotate the sleeve in the driving direction of the chuck, interengaging parts for limiting the rotation of the sleeve in one direction, said parts being so arranged that the sleeve may be rotated against the action of the spring and that the spring may return the sleeve and impart a hammer blow between said interengaging parts.

5. In a chuck which is arranged to be rotated in one direction to drive a tool, an abutment member, a cam surface spaced from the abutment member and inclined to the axis of rotation of the body, a gripping device interposed between the abutment member and the cam surface, threaded means for adjusting the space between the abutment member and the cam surface to move the gripping device into engagement with a tool and in which resistance to the rotation of a tool engaged by the gripping device actuates said threaded means to tighten the engagement of the gripping device, a shock sleeve rotatively supported by the chuck, a spring biased to rotate the sleeve in the driving direction of the chuck, interengaging means for limiting the rotation of the sleeve in one direction so arranged that the sleeve may be rotated against the action of the spring and that the spring may return the sleeve and impart a hammer blow between said interengaging means.

6. In a chuck which has a sleeve arranged to be rotated in one direction to drive a tool, a body in adjustable threaded engagement with the sleeve, an abutment member supported by the sleeve, a member affixed to the body, said member having a cam surface spaced from the abutment member and inclined to the axis of rotation of the sleeve, and a gripping device interposed between the abutment member and the cam surface and in which resistance to the rotation of a tool engaged by the gripping device turns the body on the sleeve to tighten said engagement, a shock sleeve rotatatively supported on the body, a spring biased to rotate the sleeve on the body in the driving direction of the body, interengaging parts of the body and of the sleeve to limit the relative rotation of the sleeve on the body comprising a non-continuous annular groove having a transverse end and a projection movable in said groove, said parts being so arranged that the sleeve may be rotated against the action of the spring and that the spring may return the sleeve and impart a hammer blow between said projection and the end of the groove.

7. In a chuck which has a sleeve arranged to be rotated in one direction to drive a tool, a body in adjustable threaded engagement with the sleeve, an abutment member supported by the sleeve, a pressure member affixed to the body, said member having a conical cam surface spaced from the abutment member and symmetrical to the axis of rotation of the sleeve, and a collet arranged to be seated on the abutment member and having a tapered portion arranged to be engaged by the cam surface and in which resistance to the rotation of a tool engaged by the collet turns the body on the sleeve to tighten said engagement, a shock sleeve rotatively supported on the body, a spring biased to rotate the shock sleeve on the body in the driving direction of the body, interengaging parts of the body and of said sleeve to limit the relative rotation of the sleeve on the body comprising a non-continuous annular groove having a transverse end and a projection movable in said groove, said parts being so arranged that the sleeve may be rotated against the action of the spring and that the spring may return the sleeve and impart a hammer blow between said projection and the end of the groove.

ARTHUR MERRICK STONER.